United States Patent [19]
Mayor et al.

[11] Patent Number: 6,106,708
[45] Date of Patent: Aug. 22, 2000

[54] FILTRATION EQUIPMENT FOR LIQUIDS

[75] Inventors: Domingo Hernandez Mayor; Juan Hernandez Perez, both of Sabadell, Spain

[73] Assignee: Dermacalor, S. L., Sabadell, Spain

[21] Appl. No.: 08/714,457

[22] Filed: Sep. 16, 1996

[30]    Foreign Application Priority Data

Sep. 19, 1995  [ES]  Spain ..................................... 9501851
Aug. 16, 1996  [ES]  Spain ..................................... 9601817

[51] Int. Cl.[7] ......................... B01D 35/027; B01D 35/26; B01D 35/34
[52] U.S. Cl. .......................... 210/169; 210/121; 210/136; 210/167; 210/196; 210/197; 210/323.2; 210/416.2; 210/541
[58] Field of Search .................................... 210/136, 121, 210/242.1, 167, 169, 196, 197, 405, 456, 421, 323.2, 416.2, 541

[56]           References Cited

U.S. PATENT DOCUMENTS

| | | |
|---|---|---|
| 2,826,307 | 3/1958 | Pace . |
| 2,980,256 | 4/1961 | Nash . |
| 3,143,499 | 8/1964 | Miller . |
| 3,555,574 | 1/1971 | Stanwood . |
| 3,567,020 | 3/1971 | Whitaker . |
| 3,635,343 | 1/1972 | Holland et al. . |
| 3,815,547 | 6/1974 | Willinger . |
| 4,168,590 | 9/1979 | Beshouer . |
| 4,498,984 | 2/1985 | Colson . |
| 4,606,821 | 8/1986 | D'Imperio . |
| 4,915,828 | 4/1990 | Meyers . |
| 5,306,421 | 4/1994 | Weinstein . |

FOREIGN PATENT DOCUMENTS

| | | |
|---|---|---|
| 295149 | 12/1988 | European Pat. Off. . |
| 289146 | 4/1971 | Germany . |
| 90/05011 | 5/1990 | WIPO . |

*Primary Examiner*—Thomas M. Lithgow
*Attorney, Agent, or Firm*—Ostrolenk, Faber, Gerb & Soffen, LLP

[57]           ABSTRACT

A partition includes a float on its upper edge and a partition which divides the inside of a container into two compartments. The perimeter of the partition contacts the walls and bottom of the container using a U-frame that is provided with three flexible bands. In one of the compartments, anchored on a support, are filters arranged together with the supports. An external pump transfers liquid from the bottom of one compartment to the bottom of the other compartment and channels the liquid between the flexible bands and below the partition in a uniform and calibrated manner over its entire length. At the same time, liquid passes from this second compartment to the first one above the float. The float meters and calibrates the liquid flow over its entire length, thereby generating a surface stream which discharges into the filters.

12 Claims, 4 Drawing Sheets

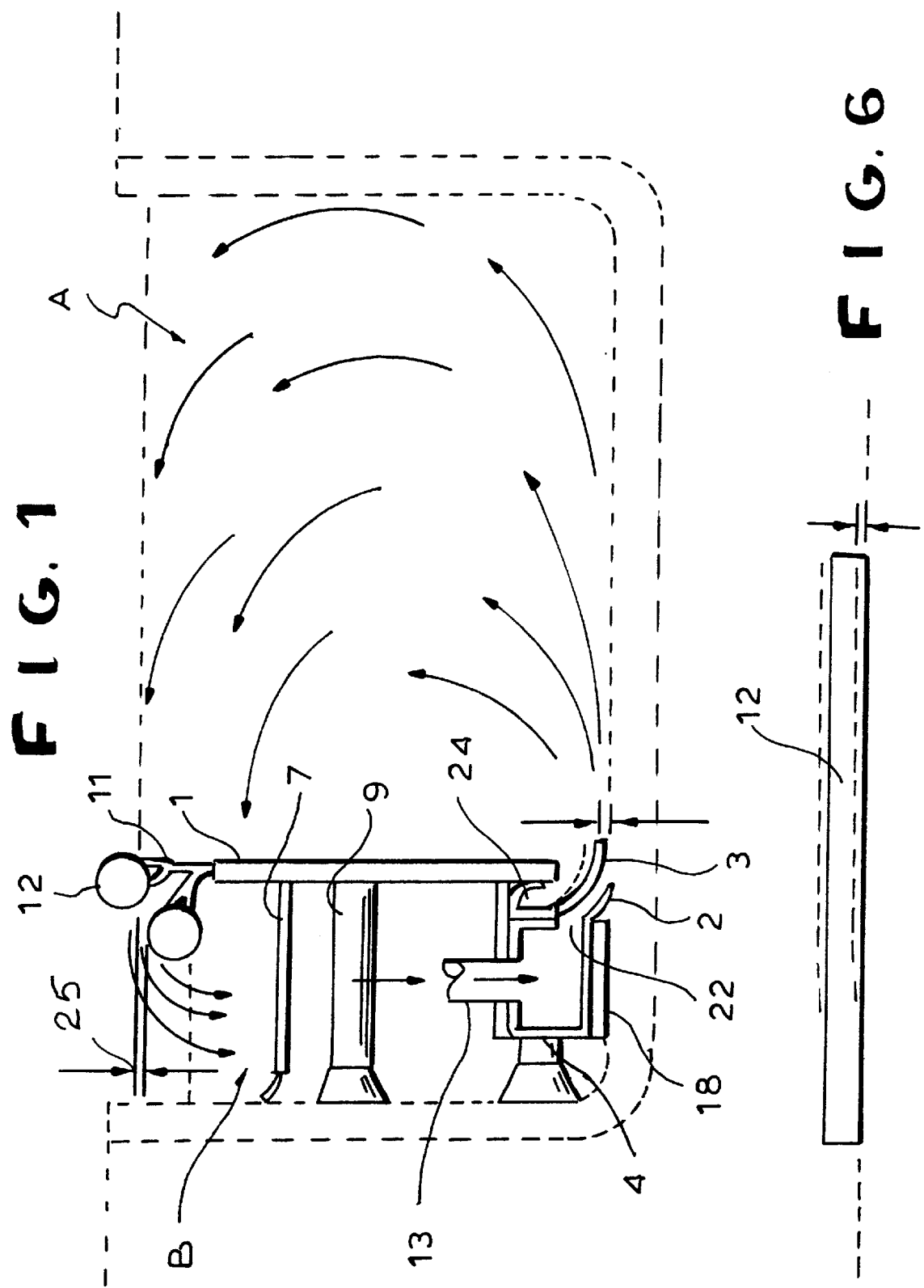

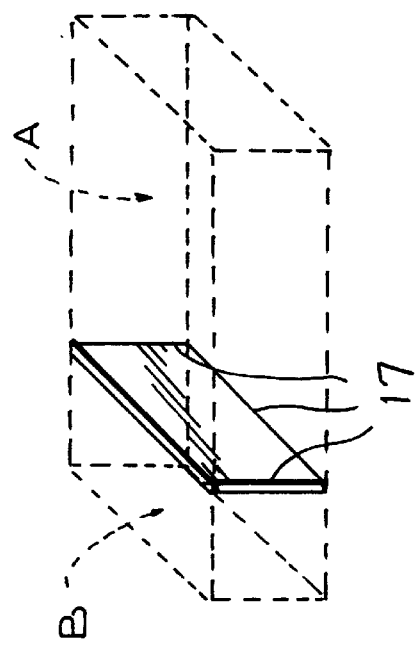
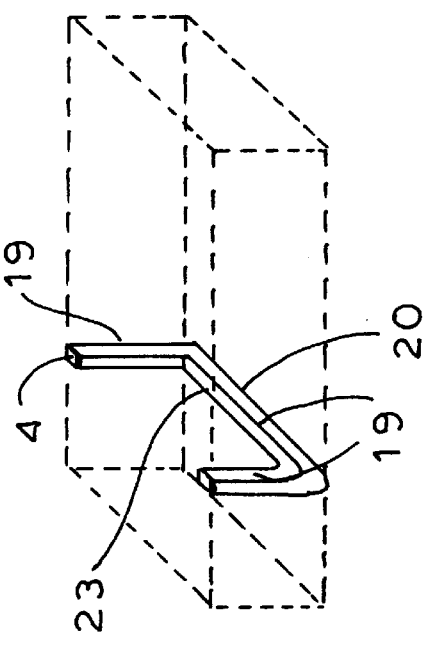
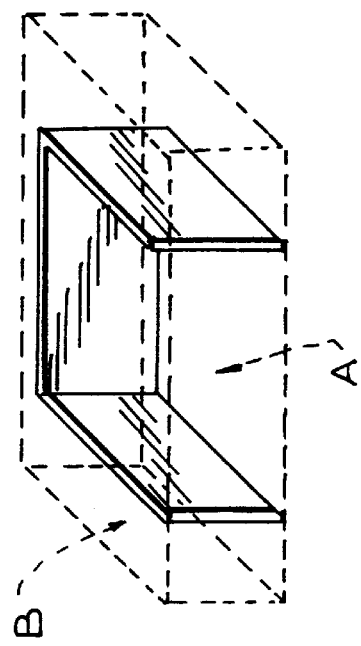
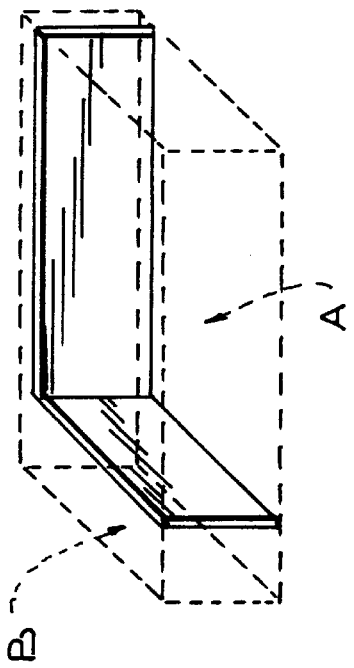

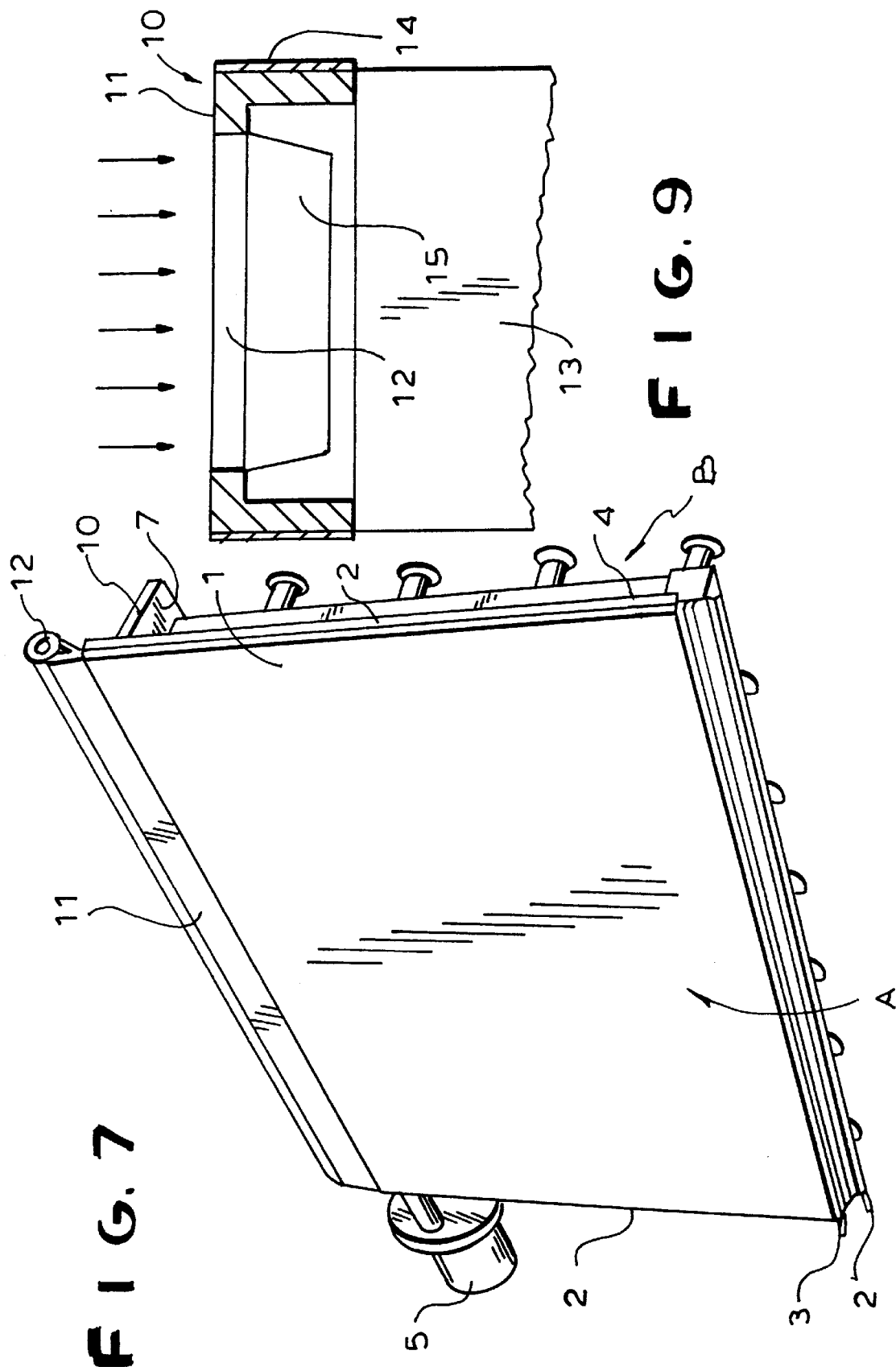

FILTRATION EQUIPMENT FOR LIQUIDS

BACKGROUND OF THE INVENTION

The present invention relates to filtration equipment for liquids which can be applied to any type of natural or artificial container of any shape and nature and for different liquids.

The filtration of liquids containing a large variety of different types of material suspended therein is attempted by various means, with greater or lesser efficiency, to obtain a flow on the surface of the liquid that is as fast as possible and which entrains the floating impurities to transfer them to the filtering elements through suitable conduits while the entire volume of liquid is removed. To achieve this transfer efficiently, it is necessary to filter large volumes of liquid relative to the volume of the container. However, achieving this transfer at a low pressure requires a very large filtering surface that occupies a large amount of space which, at times, may not be readily available and which is usually very expensive.

SUMMARY OF THE INVENTION

In the equipment of the invention, developed for use in "any type" of natural or artificial container of any shape and nature and for different liquids, this flow is easily obtained as well as the recirculation of the entire volume of liquid. It is collected on the surface and returned at the bottom in a calibrated manner in both operations, without complicated installations and within the container itself. At the same time, a filtering surface which, in many cases, is larger than that of the surface of the container itself makes it possible to filter large volumes of flow at low pressure without taking up more space on the outside thereof than is necessary for a simple recirculation pump.

BRIEF DESCRIPTION OF THE DRAWINGS

FIG. 1 shows an operating diagram of an embodiment of the filtration equipment of the present invention;

FIG. 2 shows an arrangement of the frame of the equipment shown in FIG. 1;

FIG. 3 shows an arrangement of the partition shown in FIG. 1;

FIG. 4 shows another arrangement of the partition shown in FIG. 1;

FIG. 5 shows a further arrangement of the partition shown in FIG. 1;

FIG. 6 shows the characteristics of the float;

FIG. 7 is a front perspective view of the partition and filters;

FIG. 9 is a cross section view seen through the central part of the filter shown in FIG. 8 according to another embodiment of the invention.

DETAILED DESCRIPTION OF THE INVENTION

Figure 8:
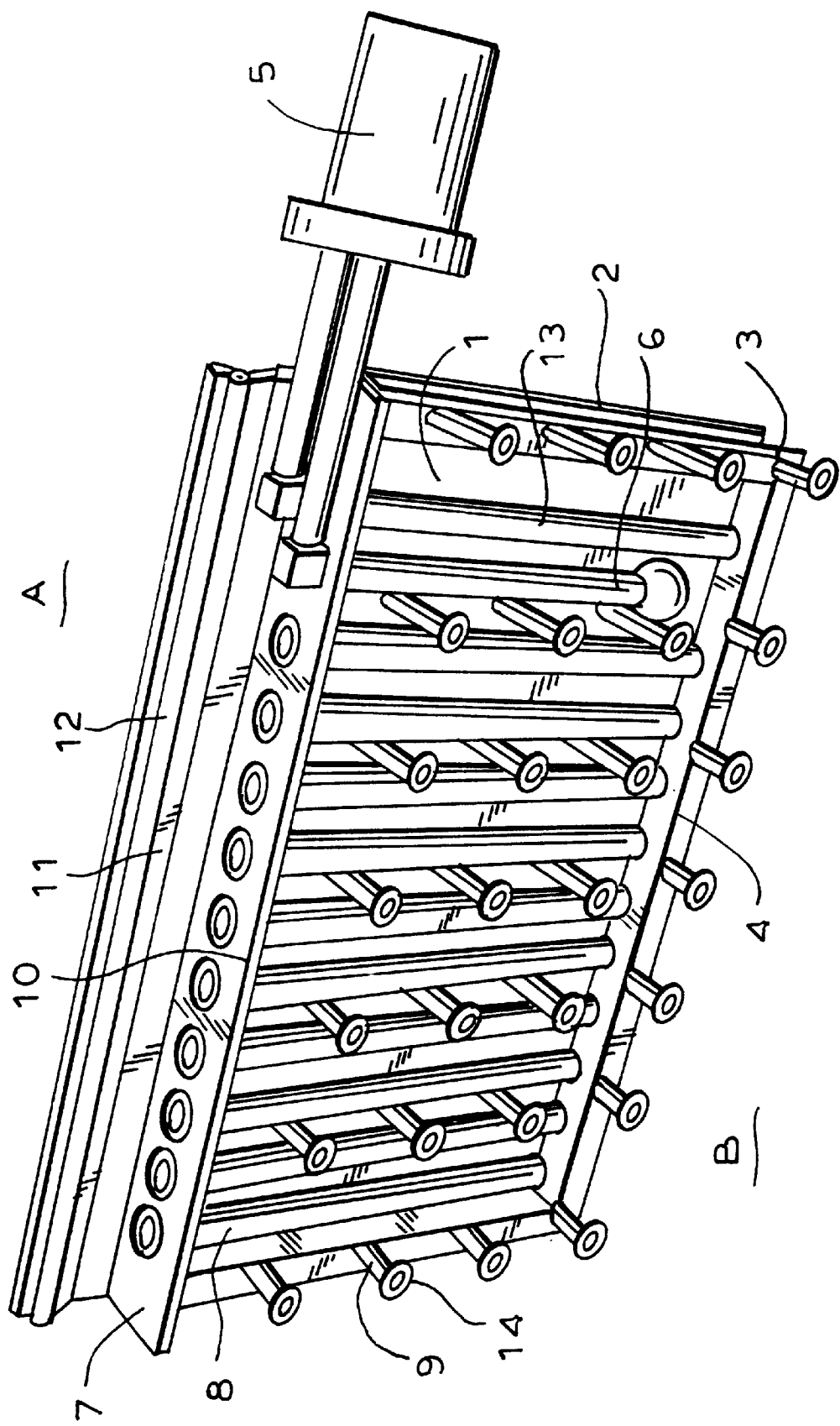
FIG. 8 is a rear perspective view of the partition and filters.

FIG. 1 shows the filtration equipment according to an embodiment of the invention in which a flat partition 1 is situated inside the receptacle containing the liquid to be filtered. The partition is arranged vertically and perpendicular to the bottom of the surface and may extend parallel to one or more sides of the container, as shown in FIGS. 3, 4 and 5. The partition is held by supports 9 which are perpendicular to the two opposing surfaces of the container and the partition. The free end of the partition 1 is covered by a soft cap 19, shown in FIG. 2.

To support the horizontal component of the differential pressure, the partition 1 divides the interior of the container into two compartments A and B, shown in FIGS. 1, 3, 4 and 5. The ends of the partition contact one or more side walls of the container and are perpendicular to the wall.

A U-shaped frame 4 abuts against the face of the partition 1 on the B compartment side of the container and is shown in greater detail in FIG. 2. The frame extends parallel to the three edges 17 of the partitions and contacts the walls and the bottom of the container. The frame 4 rests on a soft cushion 18. The outer perimeter or band 19 of the frame 4 extends and contacts the partition. A blade 3, shown in FIG. 1, extends obliquely to the partition. The frame 4 rests against the walls and the bottom of the receptacle to seal the two chambers A and B from each other by utilizing the differential pressure exerted on it by the difference in pressure levels created between the two chambers during pump operation. At the lower edge 20 of the frame, which contacts the bottom and is shown superimposed on the outer band 19, the frame has a second band 23. In the space between the first and second bands are located conduits 22 which communicate with the compartment A and permit the return channeling of the fluid which, in turn, passes to an external pump 5. On the inner surface of band 23 of the frame 4, a third band 24 flexes obliquely from a position perpendicular to a side wall of the container and rests on the B side of the partition 1 thus sealing the two compartments from each other when differential pressure acts on the partition.

Filtering elements 8, shown in greater detail in FIG. 8, are suspended from support 7 and are selected depending on the liquid to be filtered. The filtering elements may be bags of textile fabric, cartridges, conglomerates of fibers, calibrated disks, supports for diatomaceous earth, or any other known filtering elements. The filtering elements are placed in a vertical position, near the upper part of the partition 1 on the side facing compartment B and perpendicular to it and are located between the partition and the side of the container. The filtering elements rest on the partition by the band which is flexed upward and is placed over the entire contact surface between the two, thus sealing the joint.

On the upper edge of the partition 1, and attached to it by a thin flexible band 11, is a float 12 of equal length and uniform density and which protrudes above the level of the liquid.

A recirculation pump 5, shown in FIG. 8, is located on the outside of the container. The end of an intake pipe 6 for the pump is located near the bottom of the compartment B. A return conduit 13 is connected to the outlets 22, shown in FIG. 1.

OPERATION

At rest, the fluid levels in the chambers A and B are equalized through the return conduit 13 of pump 5, and its intake 6. The float 12 separates the intake and the return conduit while projecting upward.

When the pump 5 is turned on, the liquid is drawn from the bottom of the compartment B via intake pipe 6 and passes through the filters 8 which are located below the liquid surface level in compartment B, forcing the float 12 to descend below the liquid level in compartment A and allowing a volume of liquid necessary to feed the pump 5 to pass above the float. At the same time, liquid returns from pump 5 to compartment A through the return conduit 13 via the outlet 22, forcing the second flexible band 3 to lift only a distance necessary to permit the liquid to pass uniformly over its entire length and in calibrated manner beneath the partition 1. This flow creates a uniform drive force along the entire bottom of the container which creates the momentum necessary to move a volume of liquid from the bottom to the top of the compartment while liquid on the surface slips over the partition 1 toward the compartment B. The liquid is swept uniformly due to the metering effect of the float 12 which, being attached to its support by a flexible band 11, oscillates freely as shown in FIG. 6 to adapt itself to the liquid level. As a result, the float can calibrate the size of the sheet of liquid which passes over the entire length of the partition.

As can be seen, the embodiment described makes it possible to create the necessary flow on the surface in an efficient and simple manner, to filter high volumes of flow at low pressure due to the large filtering surface by adding, if necessary, filtering elements until filling the entire perimeter of the container. Also, due to the nature and low cost of these elements, it is possible to obtain different bits "micrajes" for each type of liquid and then discard them after each use or, if desired, wash them for reuse.

With respect to the amount of the investment needed for the filtration equipment, because a large outside pipelines or other annexes to the container are not necessary, the system is very economical.

In accordance with another embodiment of the invention, the filters 8 are each provided with a valve of a simple, original design which are adapted to any type of negative pressure produced by the pump 5. The valve is fitted to the head of the filter and operates in two modes. In the first mode, the valve remains open while the pump 5 operates. In the second mode, the valve remains closed while the pump is at rest. The valve is located on the neck of the filter which is modified so that the surface of the neck has a longitudinal groove on which flexible blades in the shape of lips adhere.

As FIG. 9 shows, the head 11 of the filter 10 has a longitudinal groove 12 which permits entry of water to the filters in the downward direction indicated by the arrows when the pump 5 is in operation. Also included are lips 15 made of flexible material which are located in the head of the filter 10 and in the groove 12.

When the water flows in the downward direction indicated by the arrows, caused by the negative pressure introduced on the liquid by the pump, the lips permit the water and the dirt to pass. When the negative pressure ceases caused by the stopping of the pump, the lips 15 come together and prevent the water and dirt present in the filter material 13 from emerging through the head of the filter 10 and floating to the upper part of the liquid.

When the equipment is operating, negative pressure produced by the pump moves the lips apart and permits the liquid to pass towards the inside of the filters. When the negative pressure ceases, namely when the pump is at rest, the lips come together and do not permit the liquid to pass.

This embodiment is applicable in particular to tanks of liquids such as pools and the like in which particles of dirt such as paper, leaves, insects or other particles of lower density than the liquid to be filtered are present on the surface. When the pump is at rest and when the float is withdrawn or taken apart in order to remove the filters, the dirt which has not penetrated into them appears and returns again to the liquid filtered.

This embodiment is particularly useful for compliance with mandatory regulatory requirements which do not permit mixing of the treated liquid with the liquid to be treated.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An apparatus adapted for filtering liquids, comprising:
   a container containing a liquid to be filtered;
   a partition arranged vertically inside said container and perpendicular to a bottom surface of said container, said partition extending parallel to a first side of said container and dividing the interior of said container into first and second compartments; the ends of said partition contacting and being perpendicular to second and third sides of said container; and
   a float located at an upper edge of said partition and being attached to said partition by a soft, thin, flexible blade protruding above the liquid level for controlling the rate of flow of liquid in said container.

2. An apparatus according to claim 1, further comprising a frame abutting against a face of said partition and extending parallel to the edges of said partition and contacting with the container; said frame resting on the walls and the bottom of the container atop a soft cushion interposed between the container and said frame and which, together with said partition, seals the first and second compartments from each other by including a plurality of flexible bands which permit passage of liquid between said first and second compartments in a uniform and calibrated manner beneath the partition towards the first compartment.

3. An apparatus according to claim 1 further comprising a support supporting a plurality of filtering elements which are arranged horizontally near an upper part of the partition on a side facing said second compartment and perpendicular to said partition, said filtering elements being located between said partition and a first side of the container which is parallel to said partition and resting on a band which is flexed upward and placed over the entire perimeter of contact between said partition and second, third and bottom sides of said container.

4. An apparatus according to claim 2, further comprising a plurality of struts coupled to said partition and to said frame on the surfaces thereof and perpendicular thereto; a free end of each of said struts being covered by a soft cap.

5. An apparatus according to claim 3, wherein each of said filtering elements have a head and include a longitudinal groove located inside the head of said filtering element and includes lips of substantially trapezoidal configuration which are attached to said longitudinal groove and which are sensitive to positive and negative pressures.

6. An apparatus according to claim 5, wherein said groove has one of an oval or stellate configuration, and the lips are configured to correspond to the structure of the groove.

7. An apparatus according to claim 2, wherein said float has a uniform density and the apparatus includes a pump adapted to return liquid toward the first compartment.

8. An apparatus according to claim 2 further comprising a plurality of filtering elements which are arranged horizontally near an upper part of the partition on a side facing said second compartment and perpendicular to said partition, said filtering elements being located between said partition and a first side of the container which is parallel to said partition and resting on a band which is flexed upward and placed over the entire perimeter of contact between said partition and second, third and bottom sides of said container; and a support for supporting said plurality of filtering elements.

9. An apparatus according to claim 8, wherein each of said filtering elements have a head and include a longitudinal groove located inside the head of said filtering element and includes lips of substantially trapezoidal configuration which are attached to said longitudinal groove and which are sensitive to positive and negative pressures.

10. An apparatus according to claim 9, wherein said groove has one of an oval or stellate configuration, and the lips are configured to correspond to the structure of the groove.

11. An apparatus according to claim 10, further comprising a plurality of struts coupled to said partition and to said frame on the surfaces thereof and perpendicular thereto; a free end of each of said struts being covered by a soft cap.

12. An apparatus according to claim 11, wherein said float has a uniform density and the apparatus includes a pump adapted to return liquid toward the first compartment.

* * * * *